3,220,800
PROCESS FOR THE PREPARATION OF $N_2F_4$
Kenneth J. Martin, Huntsville, Ala., assignor to Rohm & Haas Company, Philadelphia, Pa., a corporation of Delaware
No Drawing. Filed Apr. 16, 1962, Ser. No. 187,957
8 Claims. (Cl. 23—205)

This invention concerns a process for the preparation of tetrafluorohydrazine, $N_2F_4$. Specifically, it concerns a process for the preparation of $N_2F_4$ by the oxidation of difluoramine, $HNF_2$.

The process of the present invention is particularly attractive because the product is obtained in a very high degree of purity at a fraction of the cost of prior art processes.

Tetrafluorohydrazine is disclosed in the prior art, namely, Colburn et al., J.A.C.S. 80, 5004 (1958), and methods of preparation are set forth therein. In addition to the fluorine acceptors set forth therein, carbon has been used as a fluorine acceptor on a pilot plant scale, and $N_2F_4$ produced thereby. However, this lower cost fluorine acceptor suffers the disadvantage of producing a complex mixture of $CF_4$, $C_2F_6$, $N_2F_4$ and unreacted $NF_3$. It has been reported that this mixture is very difficult to separate by known means.

Tetrafluorohydrazine is of value as an oxidizer in rocket propellants (cf. "Propellant Performance Data," page 32, Callery Chemical Company, copyright by Callery, 1961).

Difluoramine is readily prepared from unsymmetrical difluorurea, which, in turn, can be made by the aqueous fluorination of urea, using fluorine as the fluorinating agent. This is a well-known reaction.

Whereas the prior art processes for the preparation of $N_2F_4$ operated at very high temperatures (Colburn et al. at 375° to 450° C.), is has been found that $N_2F_4$ can be prepared at ambient temperatures using the process of the present invention.

The preparation of $N_2F_4$ is very straightforward by the process of the present invention and consists of passing a stream of gaseous $HNF_2$ through an acidic aqueous solution of an oxidizing agent, the $HNF_2$ being converted substantially quantitatively to $N_2F_4$.

The rate of passage of the gaseous $HNF_2$ through the acidic solution can be very rapid if the apparatus being used is designed to give intimate contact of the $HNF_2$ with the acidic aqueous solution. The reaction of $HNF_2$ to produce $N_2F_4$ appears to be instantaneous and, thus, if there is adequate contact of the $HNF_2$ with the aqueous solution, high rates can be obtained with substantially complete conversion. When the apparatus is small, excellent dispersion of the $HNF_2$ can be obtained by fitting the bottom of the reaction vessel with a fritted plate which causes the $HNF_2$ to be broken up into very fine bubbles. Typical of such fritted plates are fritted glass plates, fritted Alundum plates, etc. Apparatus of larger size can be equipped to obtain adequate dispersion by the use of spargers or distribution systems, such as are common in the water conditioning industry. Very good contact can be obtained by passing the $HNF_2$ up through a tower filled with the acidic aqueous solution, which tower is packed with insoluble, inert material. These can be ceramic berl saddles, glass helices, or any of the other inert insoluble tower packing materials which are well-known in the art.

The pH or degree of acidity of the aqueous solution is governed by several factors. The degree of acidity of the solution must be sufficient to maintain the oxidizing agent in solution, but excess acidity decreases the rate of oxidation of the $HNF_2$ to $N_2F_4$. Furthermore, the amount of acid required is directly proportional to the amount of oxidizing agent present in solution. As an example, in a solution of 0.05 M in $H_2SO_4$ and 0.1 M in $FeCl_3$, the pH was in the range 1 to 2 and this represents the preferred range. It is low enough to prevent precipitation of the hydrous oxides of iron, but not so low that it affects the rate of oxidation adversely.

Although many acids may be used to control pH, it is preferred that the acid be sufficiently non-volatile, that it is not carried over by the gas stream to the product receiver. Of greatest practical use is sulfuric acid.

If the solution is not acidic, i.e. is alkaline, then an increase in the rate of conversion of $HNF_2$ to $N_2F_4$ is noted, but there is very frequently precipitation of metal oxides or hydroxides if metallic salts are the catalysts employed. Furthermore, there is an increase in the basic hydrolysis of $HNF_2$ which decreases the yield of $N_2F_4$ and results in the formation of by-products which must be separated from the desired product.

In addition to the ferric chloride set forth hereinbefore, other water-soluble ferric salts may be employed and other metallic salts can also be used. Typical of such metallic salts are potassium permanganate, chromic salts, chromates, ceric salts, such as ceric sulfate. All of these function satisfactorily, but on the basis of cost, ferric salts are preferred. In general, any water-soluble oxidizing agent can be used, but it is preferred that the oxidizing agent be non-volatile so that it is not carried by the gas stream into the product receiver.

Inasmuch as the "ic" salts can be regenerated when they have been reduced to the "ous" salts, and because $HNF_2$ represents the most expensive reactant, large excesses of the "ic" salts are employed. Based on the mechanism of the reaction, it is obviously possible to obtain $N_2F_4$ from two equivalents of $HNF_2$ and two equivalents of the "ic" salt, but excesses of as much as 100 equivalents of the salt to one of $HNF_2$ can be employed. A preferred range is 50 to 70 equivalents of the salt to one equivalent of $HNF_2$.

Once the higher valence salts have been reduced to the lower valence, they can be regenerated or revivified by passing air or oxygen through the aqueous solution of the lower valence salt.

The reaction temperature can be 0 to 100° C., but since the reaction is effected rapidly at ambient temperatures, a preferred range is 20° to 30° C.

An inert gas is generally used to force the $HNF_2$ through the aqueous solution, and the inert gas can be nitrogen, argon or helium.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

*Example I*

Ten ml. of difluoramine were rapidly forced by a stream of helium through a coarse porosity sintered glass gas dispersion stick through 35 ml. of an aqueous 0.05 M $H_2SO_4$, 0.1 M $FeCl_3$ solution, and the products were collected in a liquid nitrogen trap. The product consisted of 97% tetrafluorohydrazine, 3% nitrous oxide and a small amount of water and a trace of difluoramine which was carried over. This reaction was conducted at room temperature, namely 25° C. A portion of the ferric chloride which had been converted to ferrous chloride was regenerated by passing the air through the aqueous solution. Oxygen can be obviously used, but since the reaction using air is sufficiently fast, there is no advantage to the use of oxygen.

Example II

Ceric sulfate was substituted on an equivalent basis for the ferric chloride with substantially the same resultant end product.

Example III

An equivalent amount of potassium permanganate was substituted for the ferric chloride of Example I and substantially the same results were obtained. However, the reduced salt could not be regenerated by passing air or oxygen through the aqueous solution.

I claim:

1. A process for the preparation of $N_2F_4$ which comprises passing gaseous $HNF_2$ through an acidic aqueous solution containing a non-volatile water-soluble oxidizing agent.
2. A process as forth in claim 1 in which the reaction temperature is from 0° to 100° C.
3. A process as set forth in claim 1 in which the reaction temperature is 20° to 30° C.
4. A process as set forth in claim 1 in which the pH of the solution is in the range of 1 to 2.
5. A process as set forth in claim 1 in which the oxidizing agent is a water-soluble ferric salt.
6. A process as set forth in claim 1 in which the acidic aqueous solution contains sulfuric acid.
7. A process as set forth in claim 5 in which the ferric salt is ferric chloride.
8. A process for the preparation of $N_2F_4$ which comprises passing gaseous $HNF_2$ through an acidic aqueous solution containing a water-soluble non-volatile oxidizing agent selected from the group consisting of potassium permanganate, chromic salts, chromates, ferric salts and ceric salts.

References Cited by the Examiner

UNITED STATES PATENTS 3,077,377  2/1963  Lawton et al. _____ 23—190

MAURICE A. BRINDISI, *Primary Examiner.*

CARL D. QUARFORTH, *Examiner.*